Patented May 7, 1935

2,000,807

UNITED STATES PATENT OFFICE 2,000,807

READILY WATER SOLUBLE DRY ALGINATE

Rudolph J. Wig, Los Angeles, Calif., assignor to Kelco Company, Los Angeles, Calif., a corporation of Delaware No Drawing. Application July 7, 1933, Serial No. 679,452

14 Claims. (Cl. 252—1)

The object of this invention is to produce a dry but readily water soluble alginate; and the invention includes the method of making such alginate and the product. Heretofore alginates, such as sodium alginate, have been made by reacting moist alginic acid with dry sodium carbonate forming a thick paste which contains approximately 6 to 16 per cent of sodium alginate. This paste may then be formed into some convenient shape, as for example short rods of 1/8" to 1/4" diameter, and dried, and when dry is a hard, horny substance which does not readily dissolve in water.

In order to dissolve such dry alginate it has been customary to finely grind the dry alginate and thoroughly stir or agitate the ground alginate in water. Whether sodium alginate has been dried by a spray drier to produce a fine powder; or whether sodium alginate, dried as above described, is ground to a fine powder; in either case when the powdery sodium alginate is stirred with water the material lumps together badly and it is usually necessary to stir the mixture for hours in order to obtain complete solution of the dried alginate: for example, in making a 2 per cent solution of such alginate in small batches, such alginate dissolves so slowly that even after three hours agitation with a stirrer revolving at 800 revolutions per minute a small amount remains undissolved.

I have discovered that by adding to the alginate paste a substance or substances, such as sucrose, which will increase the tendency of the dried alginate to go into solution, the solution rate can be enhanced to the point where it will not be necessary to finely grind the dried alginate, nor to spray-dry the alginate, in order to obtain an easily dissolvable product. Other sugars may be substituted for sucrose, for example, glucose, fructose, maltose, or mixtures of these with each other or with sucrose.

For example if sufficient sucrose to constitute about 30% by weight of the ultimate dried product has been added to sodium alginate paste the resulting dry product is a hard horny substance which differs little in appearance from the pure dried alginate, but when ground to pass a 30-mesh screen will dissolve with comparative ease.

Sucrose is readily soluble in water and its presence in the alginate product is of value, in that the sucrose will quickly dissolve out of the alginate leaving it in a condition in which the particles of sodium alginate are sufficiently separated to allow water to readily enter between them. This prevents the lumping which occurs when the ordinary finely divided dried alginate is added to water, and at the same time it allows the water molecules to come in close contact with the alginate molecules. By my process not only is lumping prevented but also the rate of dissolving of the alginate is greatly increased through a more intimate contact of solvent molecules with the molecules of the dissolving substance.

A typical product is a dry sodium alginate consisting of approximately 57 per cent sodium alginate, 28 per cent sugar and 15 per cent water. One method of manufacturing it is as follows: 200 pounds of wet refined alginic acid, and 5.11 pounds of soda ash (58% $Na_2O$) are thoroughly mixed until the mixture is reduced to a uniform paste which contains approximately 23.2 pounds of sodium alginate solids, equivalent to 11.6 per cent. To this paste is then added 10.4 pounds of refined cane sugar, or refined beet sugar, and the stirring is continued until a sweetened paste of uniform composition is obtained. This sweetened paste is then formed into suitable shapes for drying, and the shapes allowed to dry until their moisture content is approximately 15 per cent or even less.

Expressed in terms of percentage of dried product containing 15 per cent water, the addition of sugar in such amounts that it constitutes approximately 15 to 60 per cent of the total weight is found to be of marked value in increasing the rate of solution of the alginate.

In the product obtained by following the procedure just described the ratio of the sugar to alginate is approximately 1 to 2. If the proportion of sugar is lessened the rate of solution of the dried mixture is lessened. If the proportion of sugar is raised there is some additional value in the rate of solution; but when the sugar/alginate ratio is too high, for example 2 to 1, the product does not dry well at the ordinary temperature but forms a sticky mass which is hard to handle.

The process described may be used in producing other readily soluble dry alginates; for example potassium alginate, or ammonium alginate: In the latter case ammonium hydroxide solution may be used instead of dry ammonium carbonate.

I claim:—

1. The herein described process of manufacturing a dry readily water soluble alginate; consisting in first mixing moist alginic acid, a carbonate and a soluble sugar, and then drying the mixture.

2. The herein described process of manufacturing a dry readily water soluble sodium alginate; consisting in first mixing moist alginic acid, sodium carbonate and a soluble sugar, and then drying the mixture.

3. The herein described process of manufacturing a readily water soluble ammonium alginate; consisting in first mixing moist alginic acid, ammonium carbonate and a soluble sugar, and then drying the mixture.

4. The herein described process of manufacturing a dry readily water soluble ammonium alginate; consisting in first mixing moist alginic acid, ammonium hydroxide and a soluble sugar, and then drying the mixture.

5. The herein described process of manufacturing a dry readily water soluble sodium alginate; consisting in first mixing moist alginic acid, sodium carbonate and sucrose; and then drying the mixture.

6. The herein described process of manufacturing a dry readily water soluble ammonium alginate; consisting in first mixing moist alginic acid, ammonium carbonate and sucrose; and then drying the mixture.

7. The herein described process of making a dry readily water soluble alginate; consisting in mixing sucrose with an alginate paste, and then drying the mixture.

8. The herein described process of making a dry readily water soluble sodium alginate; consisting in mixing sucrose with sodium alginate paste, and then drying the mixture.

9. The herein described process of making a dry readily water soluble ammonium alginate; consisting in mixing sucrose with ammonium alginate paste, and then drying the mixture.

10. A dry, readily water soluble sodium alginate produced by mixing moist sodium alginate and sugar, and then drying the mixture.

11. A dry, readily water soluble ammonium alginate produced by mixing moist ammonium alginate and sugar, and then drying the mixture.

12. A dry readily water soluble alginate, produced by mixing alginate paste and a soluble sugar, and then drying the mixture.

13. A dry readily water soluble sodium alginate, produced by mixing sodium alginate paste and a soluble sugar, and then drying the mixture.

14. A dry readily water soluble ammonium alginate, produced by mixing ammonium alginate paste and a soluble sugar, and then drying the mixture.

RUDOLPH J. WIG.